(12) United States Patent
van den Brand et al.

(10) Patent No.: US 8,815,030 B2
(45) Date of Patent: Aug. 26, 2014

(54) LAMINATING DEVICE AND LAMINATING METHOD

(75) Inventors: Jeroen van den Brand, Goirle (NL); Andreas Heinrich Dietzel, Kempen (DE); Ike de Vries, Kaatsheuvel (NL)

(73) Assignee: Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 294 days.

(21) Appl. No.: 12/922,585

(22) PCT Filed: Mar. 13, 2009

(86) PCT No.: PCT/NL2009/050123
§ 371 (c)(1),
(2), (4) Date: Dec. 2, 2010

(87) PCT Pub. No.: WO2009/113860
PCT Pub. Date: Sep. 17, 2009

(65) Prior Publication Data
US 2011/0100524 A1    May 5, 2011

(30) Foreign Application Priority Data

Mar. 14, 2008 (EP) .................................... 08152794

(51) Int. Cl.
*B32B 37/02* (2006.01)
*B32B 38/10* (2006.01)
*B32B 41/00* (2006.01)

(52) U.S. Cl.
USPC ............. 156/64; 156/252; 156/361; 156/362; 156/367; 156/368; 156/378; 156/379; 156/513

(58) Field of Classification Search
USPC ........... 156/64, 252, 361, 367, 368, 378, 379, 156/513, 362
See application file for complete search history.

(56) References Cited

U.S. PATENT DOCUMENTS

| | | | |
|---|---|---|---|
| 3,526,562 A | 9/1970 | Dahl | |
| 4,579,612 A | 4/1986 | Held | |
| 5,890,743 A | 4/1999 | Garrison | |
| 2001/0018796 A1 | 9/2001 | Lee | |
| 2002/0139485 A1* | 10/2002 | Sasaki | 156/363 |
| 2002/0195194 A1* | 12/2002 | Grabau et al. | 156/300 |
| 2004/0183247 A1 | 9/2004 | Rosenthal | |

(Continued)

FOREIGN PATENT DOCUMENTS

| | | |
|---|---|---|
| EP | 0314036 | 5/1989 |
| EP | 1341138 | 4/2005 |

(Continued)

*Primary Examiner* — George Koch
(74) *Attorney, Agent, or Firm* — Maryellen Feehery Hank; Reed Smith LLP

(57) ABSTRACT

A laminating apparatus (200) for laminating a substrate foil (SF) with a laminating foil (LF) comprises
a first and a second facility (210, 214) for providing the substrate foil and the laminating foil respectively,
a recognition facility (224, 225) for determining a location of at least one feature of at least one (LF) of the laminating foil and the substrate foil and
an alignment facility (252, 253) for aligning the at least one (LF) of the foils,
a separation facility (240) for separating a portion (SF1; LF1) of the at least one of the foils after it is controlled by the alignment facility,
a laminating facility (250, 252) for laminating the separated portion of the at least one of the foil against the other one of the foils.

9 Claims, 4 Drawing Sheets

(56) References Cited

U.S. PATENT DOCUMENTS

| | | |
|---|---|---|
| 2005/0155713 A1 | 7/2005 | Mathea |
| 2006/0137813 A1 | 6/2006 | Robrecht |
| 2009/0173428 A1 * | 7/2009 | Klingbeil et al. ............... 156/64 |
| 2009/0260739 A1 | 10/2009 | Fischer |

FOREIGN PATENT DOCUMENTS

| | | |
|---|---|---|
| WO | 9821035 | 5/1998 |
| WO | 9962801 | 12/1999 |
| WO | 0002727 | 1/2000 |
| WO | 2007002269 | 1/2007 |

* cited by examiner

LAMINATING DEVICE AND LAMINATING METHOD

RELATED APPLICATIONS

This application is the United States National Stage of International Application No. PCT/NL2009/050123, filed Mar. 13, 2009, which was published as International Publication No. WO 2009/113860, and which claims benefit of European Patent Application No. 08152794.7, filed Mar. 14, 2008. Both applications are incorporated by reference in their entirety herewith.

BACKGROUND OF THE INVENTION

1. Field of the Invention

The present invention relates to a laminating apparatus.

The present invention further relates to a laminating method.

2. Related Art

Various products are fabricated by sequential addition of components to previously supplied components. An important application area is in the manufacturing of electronic components as a stack of foils. Subsequent foils in the stack have electronic functional areas that in contact with each other perform an electronic function. A first foil forms a substrate foil whereon a next foil, the laminating foil, is laminated, e.g. by gluing. In the manufacture of said electronic components it is important that mutually subsequent foils are accurately positioned with respect to each other in order that corresponding electronic features in the subsequent foils accurately contact each other.

It is desirable that the manufacturing process can take place in a continuous production line so as to keep production costs at a moderate level. When manufacturing electronic components as a stack of foils, this would necessitate supplying the foils from separate rolls in a longitudinal direction and attaching them to each other. Various influences may cause a disalignment between the foils, such as variations in transport velocity, and stretching of the foils due to the force with which they are transported. The amount of stretching is difficult to predict, as it depends on various factors, such as the influence of the temperature of the environment on the foil, the variations in the elasticity of the foil, e.g. due to variations in the thickness of the foil. It is therefore necessary to align the foils with respect to each other before lamination.

WO-A-9806576 describes a laminating apparatus. Therein, during lamination and before solid bonding the foil strips undergo visual inspection, and tolerance differences with regard to the alignment of the various foil strips are compensated by pulling or pushing. However, pulling or pushing may cause damage to the foil strips, and the freedom of alignment is limited.

SUMMARY OF THE INVENTION

It is a purpose of the present invention to provide a laminating apparatus and a laminating method that makes it possible to align the foils with less risks of damage.

According to an aspect a laminating apparatus is provided for laminating a substrate foil with a laminating foil, the apparatus comprising

- a first and a second facility for providing the substrate foil and the laminating foil respectively,
- an alignment facility for aligning at least one of the foils with the other foil,
- a recognition and control facility for determining a location of at least one feature of at least one of the laminating foil and the substrate foil and for controlling the alignment facility,
- a separation facility for separating a portion of the at least one of the foils after it is controlled by the alignment facility,
- a laminating facility for laminating the separated portion of the at least one of the foil against the other one of the foils.

As the portion of at least one of the foils is separated from the at least one of the foils after it is controlled by the alignment facility, the orientation and position of said portion becomes independent of the remainder of the at least one of the foils. It is possible that more than two foils are laminated simultaneously. The most vulnerable one of the foils, but alternatively both or each of the foils, may be aligned in this manner. Therewith the alignment facility can accurately control the alignment of that portion while causing substantially less stresses in the at least one of the foils.

The alignment facility may for example comprise a pair of rolls. Dependent on an output signal of the recognition and control facility the position of the rolls may be laterally shifted, their rotation axis may be tilted within the plane of the at least one of the foils, and the rotation speed may be varied to align the position of the at least one of the foils with the other one of the foils.

When the separation device separates the portion of the at least one of the foils after the remainder of the at least one of the foils is gripped by the projections alignment facility, the laminating apparatus can operate in a continuous process.

In an embodiment, the laminating apparatus comprises a perforation facility for applying perforations in the at least one of the foils at a location related to the location determined for the at least one feature, the alignment facility comprising a moveable alignment surface with projections for cooperation with the perforations. In this embodiment, the cooperation between the projections of the alignment facility and the perforations in the at least one of the foils provides for the alignment between the at least one of the foils with the at least one other foil. As the location of the perforations is related to the location determined for the at least one feature, the alignment is continuously adjusted. Due to the fact that the portion of the at least one of the foils is separated after it is controlled by the alignment facility, i.e. after the projections of the alignment facility cooperate with the perforations of the at least one of the foils, the alignment is not disturbed by the remainder of the at least one of the foils. The alignment facility may for example have a roll or a continuous belt at which the projections are arranged.

In a variation of said embodiment the projections are tapered. The projections may for example have a (truncated) conical or pyramidal shape. In this embodiment the projections of the alignment facility can smoothly grip into the perforations in the at least one of the foils.

In a variation of said embodiment, the projections have a cross-section in a contact plane of the alignment surface with a size smaller than a size of a cross-section of the perforations. This embodiment allows the at least one of the foils still to have some play after it is gripped by the projections. After the separation facility has separated the portion of the at least one of the foils, said separated portion can freely move with respect to the alignment surface, until the projections reach an edge (front-edge) of the perforations at a side of the perforation in the transportation direction.

In a practical embodiment the perforations have a width that narrows in a transportation direction of the foil to a width at most equal to the size of the cross-section of the projections. At the moment that the projections reach the front-edge the separated portion of the foil is fully aligned with the alignment surface, and accordingly the foils gripped by the projections at the alignment surface are aligned with each other.

The substrate and/or the laminating foil may be composed of a stack of sub-foils. Accordingly, a laminated foil may be used again as a substrate for a next laminating foil. This laminating foil may on its turn be a laminated foil.

According to a second aspect, a method for laminating a substrate foil with a laminating foil is provided, comprising the steps of
providing the substrate foil and the laminating foil,
determining a location of at least one feature at at least one of the laminating foil and the substrate foil and
separating a portion of the at least one of the foils,
aligning the foils,
laminating the separated portion of the at least one of the foils against the other one of the foils.

BRIEF DESCRIPTION OF THE DRAWINGS

These and other aspects are described in more detail with reference to the drawing. Therein.

DETAILED DESCRIPTION OF EMBODIMENTS

Figure 1:
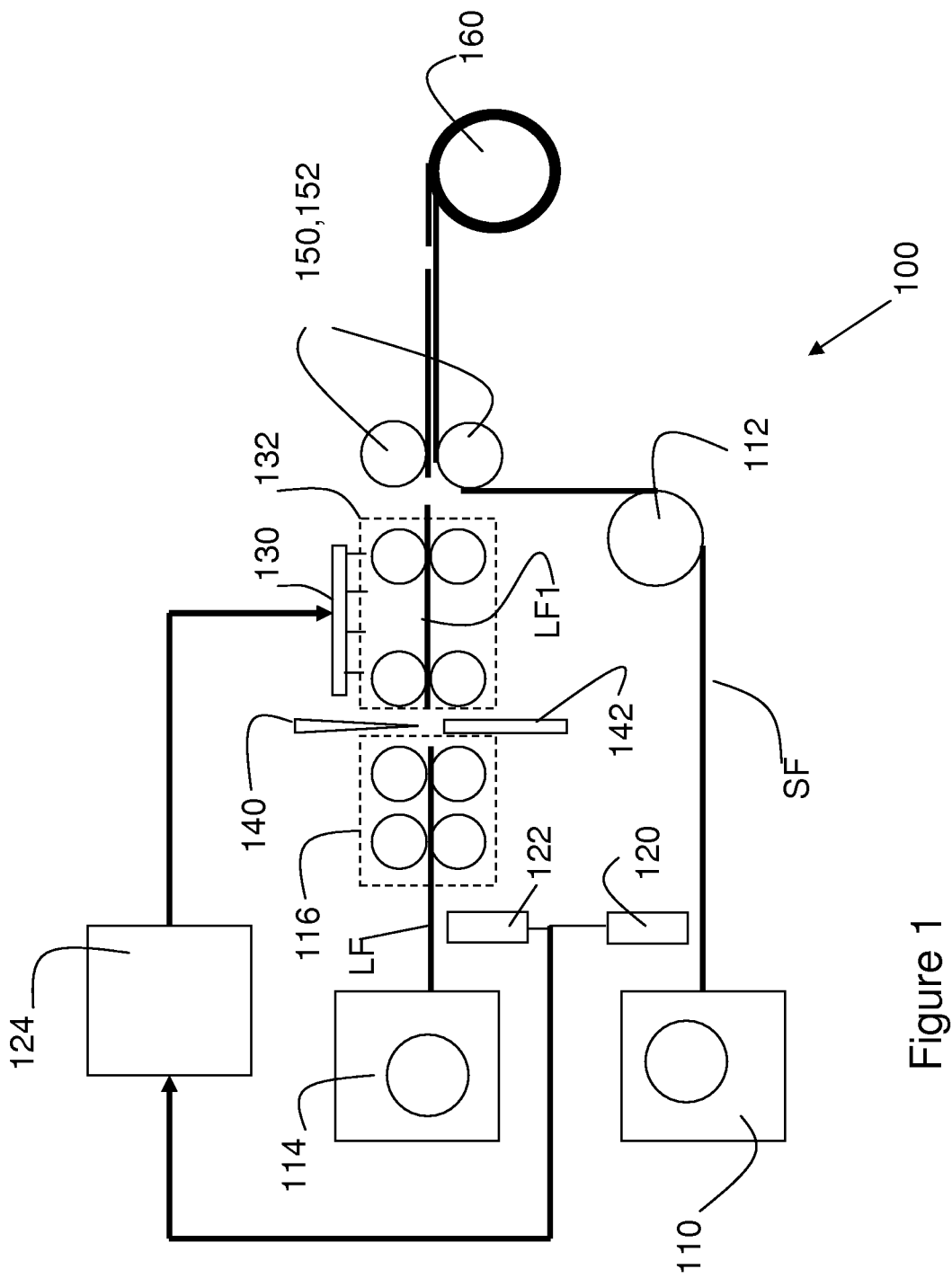
FIG. 1 shows a first embodiment of a laminating apparatus.

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In case of conflict, the present specification, including definitions, will control. In addition, the materials, methods, and examples are illustrative only and not intended to be limiting.

FIG. 1 shows a first embodiment of a laminating apparatus 100 for laminating a substrate foil with a laminating foil.

The apparatus comprises a first facility for providing the substrate foil SF and a second facility for providing the laminating foil LF respectively. The first facility for providing the substrate foil comprises a holder 110 with at least one supply roll. The container may comprise a plurality of supply rolls and a replacement device that automatically replaces an empty roll by a full roll, to prevent interruptions of the lamination process. The first facility further comprises a guide roll 112 that guides the substrate roll to a laminating facility 150, 152.

The second facility for providing the laminating foil LF comprises a second holder 114, which may be similar to the first holder 110. The laminating foil is subsequently provided to a first and second pair of guidance rolls 116. A recognition facility and control facility is provided for determining a location of at least one feature of at least one of the laminating foil and the substrate foil. In the embodiment shown the recognition and control facility comprises a first and a second camera 120, 122 respectively for recognizing features present at the substrate foil SF and the laminating foil LF respectively. The recognition and control facility further comprises a processor 124 for processing the video signals obtained from the cameras and for providing control signals to an alignment facility. The features present at the substrate foil and/or the laminating foil are for example patterns formed by electronic structures, such as conductors on the foil. Alternatively separate markers may be provided at the foil(s) that are particular suitable for image recognition purposes.

The laminating apparatus 100 also comprises an alignment facility for aligning the laminating foil LF. The alignment facility comprises a first and a second pair of alignment rolls 132. The alignment rolls 132 are driven by a motor unit 130. Also this motor unit controls a lateral position and orientation of the alignment rolls 132. The motor unit 130 is controlled by the recognition facility and control facility.

The processor 124 of the recognition and control facility may be implemented in dedicated hardware or software, or a combination of both. The laminating apparatus is provided with a separation facility for separating a portion of the at least one of the foils after it is controlled by the alignment facility. The separation facility here formed by a pair of a knife 140 and an anvil 142 separates a portion LF1 of the laminating foil LF after it is controlled by the alignment facility 132. In this case the portion LF1 is considered controlled by the alignment facility 132 if it is clamped by the first pair of rolls and by the second pair of rolls. After the portion LF1 is separated from the remainder LF of the laminating foil, its orientation can be freely controlled by the alignment facility 132, without being restricted by the remainder of the foil LF.

Other means may be present to separate a portion LF1 from the laminating foil LF, e.g. separation may be achieved by a laser beam. This has the advantage that the movement of the laminating foil need not be interrupted.

In addition or alternatively a facility may be present to align the substrate foil SF.

The lamination apparatus further comprises a laminating facility, comprising a pair of rolls 150, 152 for laminating the separated portion LF1 of the at least one of the foil LF against the other one of the foils, here the substrate foil SF. The laminating facility may alternatively be formed by a pair of endless belts. Alternatively the portions LF1 may be pressed against the substrate foil by a pair of plates. In this case however the process flow has to be periodically interrupted, each time a next portion LF1 is laminated onto the substrate foil. The laminated substrate foil is wound onto a storage roll 160.

In an alternative arrangement, wherein both the foils are separated into portions, the laminated substrate portion may be stored on a stack.

Figure 2:
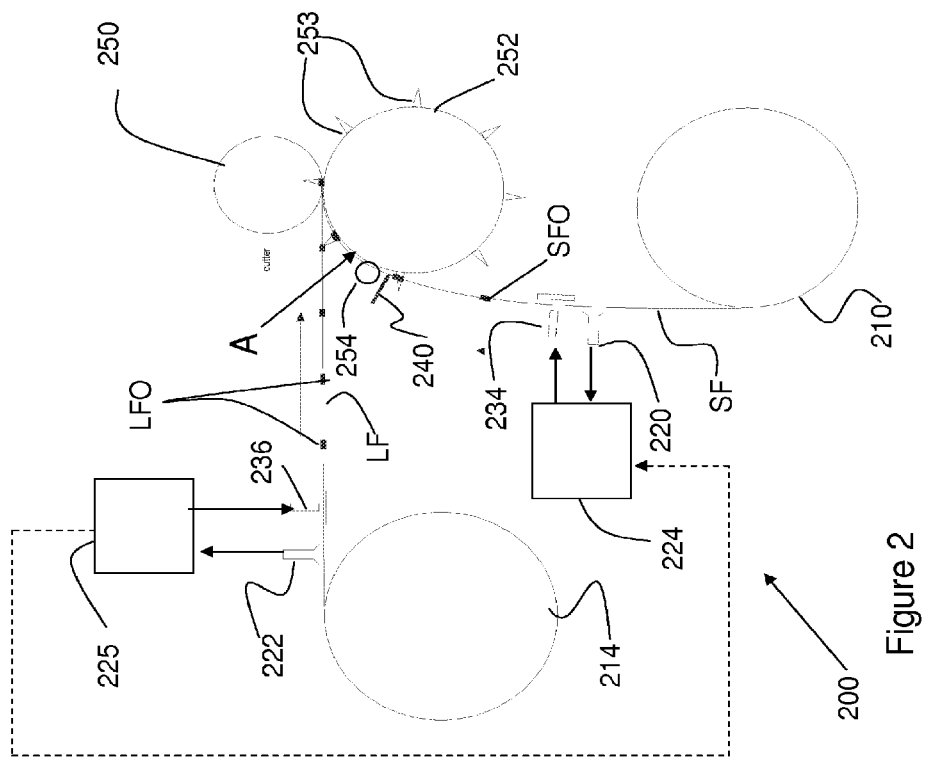
FIG. 2 shows a second embodiment of a laminating apparatus.

FIG. 2 shows a second embodiment. Parts therein corresponding to those of FIG. 1 have a reference number that is 100 higher.

The embodiment shown in FIG. 2 differs from the embodiment in FIG. 1, in that the lamination apparatus 200 comprises a perforation facility. The perforation facility 234 applies perforations SFO in the foil SF that is separated into portions SF1. The perforations SFO are applied at a location having a fixed relationship to the location determined for the at least one feature SFF in the substrate foil. Additionally a perforation facility 236 is present that applies perforations in the laminating foil LF. The location for the at least one feature SFF in the substrate foil SF is determined by a camera 220 and a pattern recognition and control facility 224. The pattern recognition and control facility 224 provides an output signal to the perforation facility 236. The perforation facility 236 is controlled by a further pattern recognition and control facility 225. The perforations SFO in the substrate foil SF and perforations LFO in the laminating foil LF cooperate with an alignment facility 252 comprising a moveable alignment surface with projections 253 for cooperation with the perforations SFO. The movable alignment surface 252 provided with projections 253 is a roller, but may alternatively be an endless belt, or a chain. In this embodiment, a central part 252C of the roller cooperates with a further roller 250 to form a lamination facility.

Figure 2B:
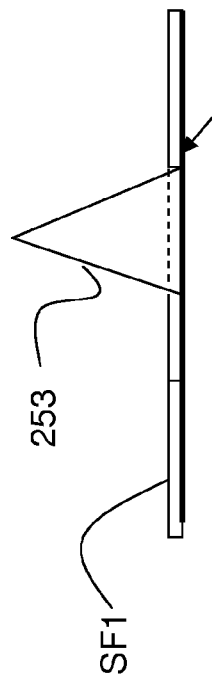
FIG. 2B shows a second detail according to side-view B in FIG. 2A.
Figure 2C:
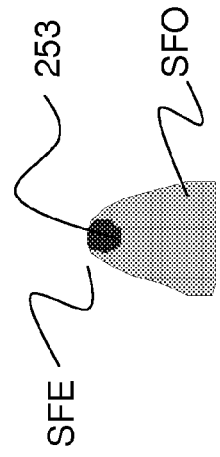
FIG. 2C shows a third detail as indicated by C in FIG. 2B.
Figure 2A:
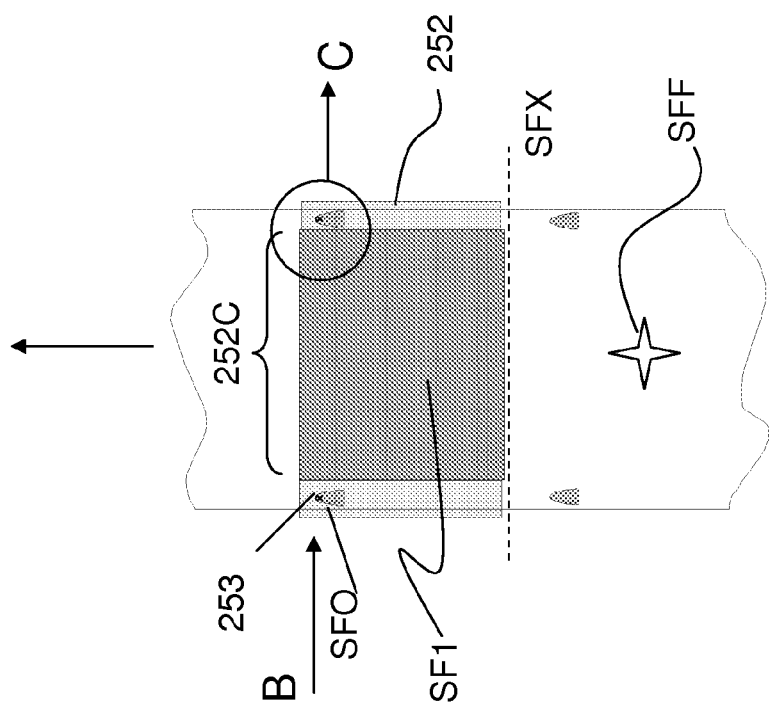
FIG. 2A shows a first detail of the laminating apparatus according to view A in FIG. 2.

As shown in more detail in FIG. 2A, which is a view according to A in FIG. 2, the cooperation between the projections 253 of the alignment facility 252 and the perforations SFO in the at least one of the foils SF provides for the alignment between the at least one of the foils with the other one of the foils. As the location of the perforations SFO has a fixed relationship to the location determined for the at least one feature SFF, the alignment is continuously adjusted. Due to the fact that the portion SF1 of the at least one of the foils is separated at line SFX from the remainder of the foil SF after the projections 253 of the alignment facility 252 cooperate with the perforations SFO of the foils, the alignment of the portion SF1 is not disturbed by the remainder SF of the substrate foil. After alignment, the substrate foil SF and the laminating foil LF are laminated upon each other by the first laminating roll 250 and a portion 252C of the alignment roll 252.

The further pattern recognition facility 225 may be coupled to the pattern recognition facility 224. In this way the further pattern recognition facility 225 may transmit information about misalignments of the laminating foil LF. The pattern recognition and control facility 224 may use this information to adapt the position of the perforations SFO so as to compensate for the misalignment of the laminating foil. Alternatively, the substrate foil SF and the laminating foil LF may be aligned fully independently of each other.

As shown schematically in FIG. 2B, which is a side-view according to B in FIG. 2A, the projections 253 in the alignment facility 252 are tapered in this embodiment. In the example of the FIG. 2B the projection is cone-shaped. The cone-shaped projections 253 may be truncated. Alternatively, a (truncated) pyramidal shape may be used. In this embodiment the projections of the alignment facility can smoothly grip into the perforations in the at least one of the foils.

As shown schematically in FIG. 2C, the projections 253 have a cross-section in a contact plane of the alignment surface with a size smaller than a size of a cross-section of the perforations SFO.

If the foil SF is gripped by the projections 253 of the alignment facility, the foil SF has some play, in that it can still move along the alignment surface and rotate in the plane defined by that surface. Accordingly, even if the supply roll 210 is not fully aligned with the alignment facility it is prevented that stress is exerted to the foil SF. After the separation facility 140 has separated the portion SF1 of the at least one of the foils SF1 can freely move with respect to the alignment surface, until the projections 253 reach an edge SFE of the perforations SFO at a side of the perforation in the transportation direction. Alignment of the projections 253 with said front edges SFE may be promoted by application of an external force exerted by a roller or a brush 254 (FIG. 2) that exerts a friction at the separated portion SF1, so that the movement of the separated portion SF1 is temporarily slowed down. Alternatively the movement of the portion SF1 may be temporarily slowed down by gravity forces working on said portion.

As shown in FIG. 2C, which is an enlarged view of portion C in FIG. 2A, in this embodiment, the perforations SFO have a width that narrows in a transportation direction of the foil SF to a width at most equal to the size of the cross-section of the projections.

Figure 3:
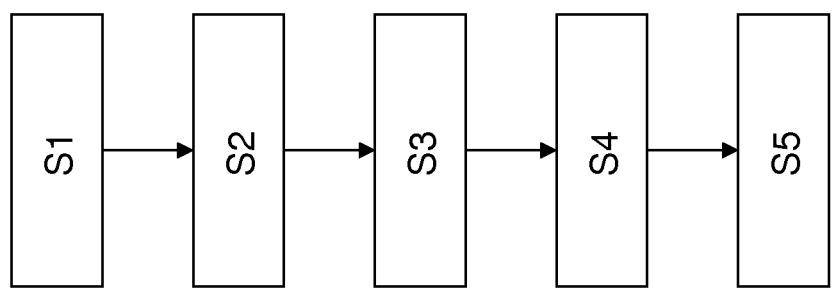
FIG. 3 illustrates a method according to the invention.

FIG. 3 summarizes the method for laminating a substrate foil with a laminating foil In a first step (S1) the substrate foil and the laminating foil are provided.

In a second step (S2) a location is determined of at least one feature of at least one of the laminating foil and the substrate foil.

In a third step (S3) a portion is separated of the at least one of the foils.

In a fourth step (S4) the foils are aligned and subsequently the separated portion of the at least one of the foils is pressed (S5) against the (separated portion of the) other one of the foils.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combination of these measures cannot be used to advantage. Any reference signs in the claims should not be construed as limiting the scope.

The invention claimed is:

1. A method for laminating a substrate foil with a laminating foil, comprising the steps of
    providing the substrate foil and the laminating foil;
    determining a location of at least one feature of the laminating foil with a first camera and a location of at least one feature of the substrate foil with a second camera;
    processing signals obtained from said cameras to provide one or more control signals to a motor of an alignment facility including a motor and at least a pair of alignment rolls;
    providing the motor with said one or more control signals to control at least a position of the alignment rolls therewith;
    controlling a longitudinal portion of the at least one of the foils by the alignment facility;
    separating said longitudinal portion of the at least one of the foils so that the orientation and position of said longitudinal portion becomes independent of the remainder of said at least one of the foils and the orientation and position of said longitudinal portion can be freely controlled by the alignment facility, without being restricted by the remainder of said at least one of the foils;
    aligning the foils with the alignment facility; and
    pressing the separated longitudinal portion of the at least one of the foils against the other one of the foils.

2. A laminating apparatus for laminating a substrate foil with a laminating foil, the apparatus comprising
    a first and a second facility for providing the substrate foil and the laminating foil respectively;
    an alignment facility including a motor and at least a pair of alignment rolls, the motor being configured to control at least a position of the alignment rolls;
    at least one of the foils having a longitudinal portion that is controlled by the alignment facility;
    a recognition and control facility including:
        a first camera configured to recognize at least one feature present on the substrate foil;
        a second camera configured to recognize at least one feature present on the laminating foil; and
        a processor configured to process signals obtained from the cameras and provide one or more control signals to the alignment facility;
    a separation facility for separating said longitudinal portion of the at least one of the foils so that the orientation and position of said longitudinal portion becomes independent of the remainder of said at least one of the foils and the orientation and position of said longitudinal portion can be freely controlled by the alignment facility, without being restricted by the remainder of said at least one of the foils; and
    a laminating facility for laminating the separated longitudinal portion of the at least one of the foils against the other one of the foils.

3. A laminating apparatus according to claim 2, comprising a perforation facility for applying perforations in the at least one of the foils at a location related to the location determined for at least one of the features, the alignment facility comprising a moveable alignment surface with projections for cooperation with the perforations.

4. The laminating apparatus of claim 3, wherein the projections are tapered.

5. The laminating apparatus of claim 3, wherein the projections have a cross-section in a contact plane of the alignment surface with a size smaller than a size of a cross-section of the perforations.

6. The laminating apparatus of claim 4, wherein the projections have a cross-section in a contact plane of the alignment surface with a size smaller than a size of a cross-section of the perforations.

7. The laminating apparatus of claim 3, wherein the perforations have a width that narrows in a transportation direction of the foil to a width at most equal to the size of the cross-section of the projections.

8. The laminating apparatus of claim 2, wherein the separation device separates the longitudinal portion of the at least one of the foils after the remainder of the at least one of the foils is gripped by the alignment facility.

9. The laminating apparatus of claim 2, wherein both foils are separated before alignment.

* * * * *